United States Patent
Anderson et al.

(10) Patent No.: US 11,038,542 B2
(45) Date of Patent: Jun. 15, 2021

(54) ACTIVE MULTIPLEXER REPEATER ACCESSORY

(71) Applicant: WILSON ELECTRONIC, LLC, St. George, UT (US)

(72) Inventors: Dale Robert Anderson, Colleyville, TX (US); Christopher Ken Ashworth, Toquerville, UT (US); Michael James Mouser, Wylie, TX (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 16/729,007

(22) Filed: Dec. 27, 2019

(65) Prior Publication Data

US 2020/0212942 A1 Jul. 2, 2020

Related U.S. Application Data

(60) Provisional application No. 62/787,176, filed on Dec. 31, 2018.

(51) Int. Cl.
*H04B 7/15* (2006.01)
*H04B 1/00* (2006.01)
(Continued)

(52) U.S. Cl.
CPC ......... *H04B 1/0057* (2013.01); *H04B 1/0078* (2013.01); *H04B 1/04* (2013.01); *H04B 1/44* (2013.01); *H04B 2001/0416* (2013.01)

(58) Field of Classification Search
CPC ...... H04B 1/04; H04B 1/0053; H04B 1/0057; H04B 1/0078; H04B 1/3877; H04B 1/40;
(Continued)

(56) References Cited

U.S. PATENT DOCUMENTS 4,776,032 A 10/1988 Odate et al.
5,303,395 A 4/1994 Dayani
(Continued)

FOREIGN PATENT DOCUMENTS

EP 1525678 B1 7/2008

OTHER PUBLICATIONS

3GPP2 C.S0011-B; "Recommended Minimum Performance Standards for cdma2000® Spread Spectrum Mobile Stations"; TIA-98-E (Dec. 13, 2002); 448 pages; Release B, V1.0, Revision E.
(Continued)

*Primary Examiner* — Quochien B Vuong
(74) *Attorney, Agent, or Firm* — Thorpe North & Western

(57) ABSTRACT

A technology is described for a bi-directional repeater having a switchable antenna port. The repeater can comprise a switchable common port, a switchable second-band port, and a switchable third-band port. The repeater can have a first-band amplification and filtering path coupled to the switchable common port via a first path of a first multiplexer. The repeater can have a second-band amplification and filtering path coupled to one of the switchable common port via a second path of the first multiplexer, a first path of a first radio frequency (RF) switch, and a first path of a second multiplexer. The repeater can have a third band amplification and filtering path coupled to the switchable common port via a first path of a second RF switch, the second path of the second multiplexer, the first path of the first RF switch, and the second path of the first diplexer.

33 Claims, 9 Drawing Sheets

(51) Int. Cl.
  *H04B 1/44* (2006.01)
  *H04B 1/04* (2006.01)
(58) Field of Classification Search
  CPC .......... H04B 1/44; H04B 3/36; H04B 7/1555;
      H04B 7/14; H04B 7/15; H04B 7/15528;
      H04B 7/15535; H04B 7/15541; H04B
      7/15578; H04B 17/40; H04W 88/04
  See application file for complete search history.

(56) References Cited

U.S. PATENT DOCUMENTS

| | | | |
|---|---|---|---|
| 5,457,814 A * | 10/1995 | Myrskog | H04B 1/3877 |
| | | | 455/569.1 |
| 5,737,687 A | 4/1998 | Martin et al. | |
| 5,777,530 A | 7/1998 | Nakatuka | |
| 5,835,848 A | 11/1998 | Bi et al. | |
| 6,005,884 A | 12/1999 | Cook et al. | |
| 6,711,388 B1 | 3/2004 | Neitiniemi | |
| 6,889,033 B2 | 5/2005 | Bongfeldt | |
| 6,990,313 B1 | 1/2006 | Yarkosky | |
| 7,035,587 B1 | 4/2006 | Yarkosky | |
| 7,221,967 B2 | 5/2007 | Van Buren et al. | |
| 7,577,398 B2 * | 8/2009 | Judd | G01S 19/25 |
| | | | 455/11.1 |
| 7,974,573 B2 | 7/2011 | Dean | |
| 8,452,231 B2 * | 5/2013 | Mohebbi | H04B 7/15557 |
| | | | 455/11.1 |
| 8,570,915 B2 * | 10/2013 | Sundstrom | H04B 7/15542 |
| | | | 370/279 |
| 10,419,080 B2 * | 9/2019 | Liang | H04B 7/0452 |
| 10,630,373 B2 * | 4/2020 | Gharavi | H04B 7/15 |
| 2002/0044594 A1 | 4/2002 | Bongfeldt | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0084379 A1 | 4/2006 | O—Neill | |
| 2007/0071128 A1 | 3/2007 | Meir et al. | |
| 2007/0188235 A1 | 8/2007 | Dean | |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2011/0151775 A1 | 6/2011 | Kang et al. | |
| 2018/0248676 A1 | 8/2018 | Raggio et al. | |

OTHER PUBLICATIONS

ADL5513; "1 MHz to 4 GHz, 80 dB Logarithmic Detector/ Controller"; Data Sheet; (2008); 12 pages; Analog Devices, Inc.
HMC713LP3E; "54 dB, Logarithmic Detector / Controller, 50—8000 MHz"; Data Sheet; (2010); 12 pages.
HMC909LP4E; "RMS Power Detector Single-Ended, DC—5.8 GHz"; Data Sheet; (2010); 21 pages.
PIC16F873; "28/40-Pin 8-Bit CMOS FLASH Microcontrollers"; (2001); Data Sheet, 218 pages.

* cited by examiner

ACTIVE MULTIPLEXER REPEATER ACCESSORY

RELATED APPLICATIONS

The present application claims the benefit of U.S. Provisional Patent Application No. 62/787,176, filed Dec. 31, 2018, the entire specification of which is hereby incorporated by reference in its entirety for all purposes.

BACKGROUND

Repeaters can be used to increase the quality of wireless communication between a wireless device and a wireless communication access point, such as a cell tower. Repeaters can enhance the quality of the wireless communication by amplifying, filtering, and/or applying other processing techniques to uplink and downlink signals communicated between the wireless device and the wireless communication access point.

As an example, the repeater can receive, via an antenna, downlink signals from the wireless communication access point. The repeater can amplify the downlink signal and then provide an amplified downlink signal to the wireless device. In other words, the repeater can act as a relay between the wireless device and the wireless communication access point. As a result, the wireless device can receive a stronger signal from the wireless communication access point. Similarly, uplink signals from the wireless device (e.g., telephone calls and other data) can be directed to the repeater. The repeater can amplify the uplink signals before communicating, via the antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
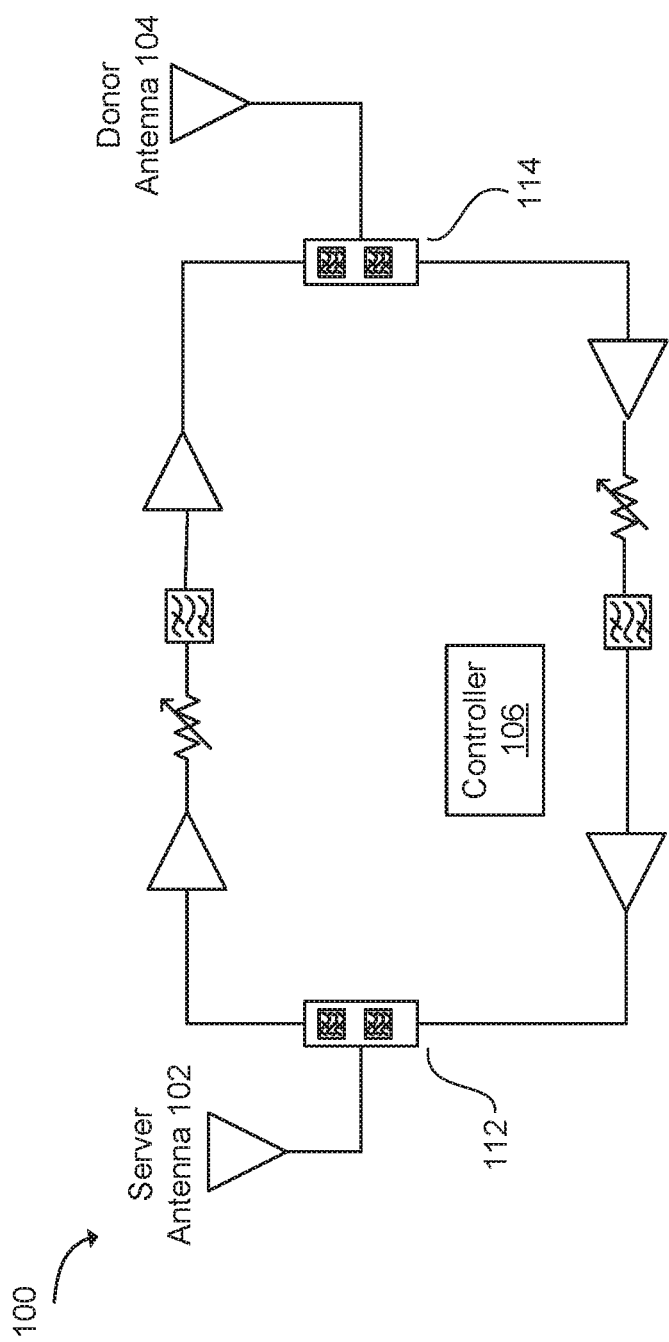
FIG. 1 illustrates a repeater in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The terms "wireless repeater" and "signal booster" and "cellular signal amplifier" are used interchangeably herein.

The terms "server antenna" and "coupling antenna" are used interchangeably herein. The server antenna can be disposed in a cradle and can form an RF signal coupler to wirelessly couple one or more RF communication signals to a wireless user device carried by the cradle. In addition, the server antenna can be an inside antenna.

The terms "donor antenna" and "node antenna" are used interchangeably herein. The donor antenna can be an outside antenna. The donor antenna can wirelessly couple one or more RF communication signals to a base station or cell phone tower.

The terms "one or more RF communication signals" and "downlink signal" or "uplink signal" are used interchangeably herein. The wireless repeater or signal booster can receive, via an antenna, downlink signals from the wireless communication access point. The wireless repeater or signal booster can amplify the downlink signal and then provide an amplified downlink signal to the wireless user device. Similarly, uplink signals from the wireless user device (e.g., telephone calls and other data) can be directed to the wireless repeater or signal booster. The wireless repeater or signal booster can amplify the uplink signals before communicating, via an antenna, the uplink signals to the wireless communication access point.

The term "signal splitter" is used broadly herein to refer to a device that divides a radio frequency (RF) communication signal, and can include a tap and a directional coupler. The division of the RF communication signal can be equal or even as in the case of a signal splitter, or can be uneven as in the case of the tap or the directional coupler. The signal tap can be an uneven splitter that couples some signal off of the signal path. A coupled port gets less of the signal depending upon a coupling factor. An in-line attenuator can be coupled to the coupled port to obtain a desired about of gain In an example, as illustrated in FIG. 1, a bi-directional repeater system can comprise a repeater 100 connected to an outside antenna 104 or donor antenna 104 and an inside antenna 102 or server antenna 102. The repeater 100 can include a donor antenna port that can be internally coupled to a second duplexer (or diplexer or multiplexer or circulator or splitter) 114. The repeater 100 can include a server antenna port that can also be coupled to a first duplexer (or diplexer or multiplexer or circulator or splitter) 112. Between the two duplexers, 114 and 112, can be two paths:

a first path and a second path. The first path can comprise a low noise amplifier (LNA) with an input coupled to the first duplexer 112, a variable attenuator coupled to an output of the LNA, a filter coupled to the variable attenuator, and a power amplifier (PA) coupled between the filter and the second duplexer 114. The filter can use any suitable analog filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters. The power amplifier can be a variable power amplifier, or a power amplifier with a fixed amplitude. The LNA can amplify a lower power signal without degrading the signal to noise ratio. The PA can adjust and amplify the power level by a desired amount. A second path can comprise an LNA with an input coupled to the second duplexer 114, a variable attenuator coupled to an output of the LNA, a filter coupled to the variable attenuator, and a PA coupled between the filter and the first duplexer 112. The first path can be a downlink amplification path or an uplink amplification path. The second path can be a downlink amplification path or an uplink amplification path. The repeater 100 can also comprise a controller 106. In one example, the controller 106 can include one or more processors and memory.

Figure 2:
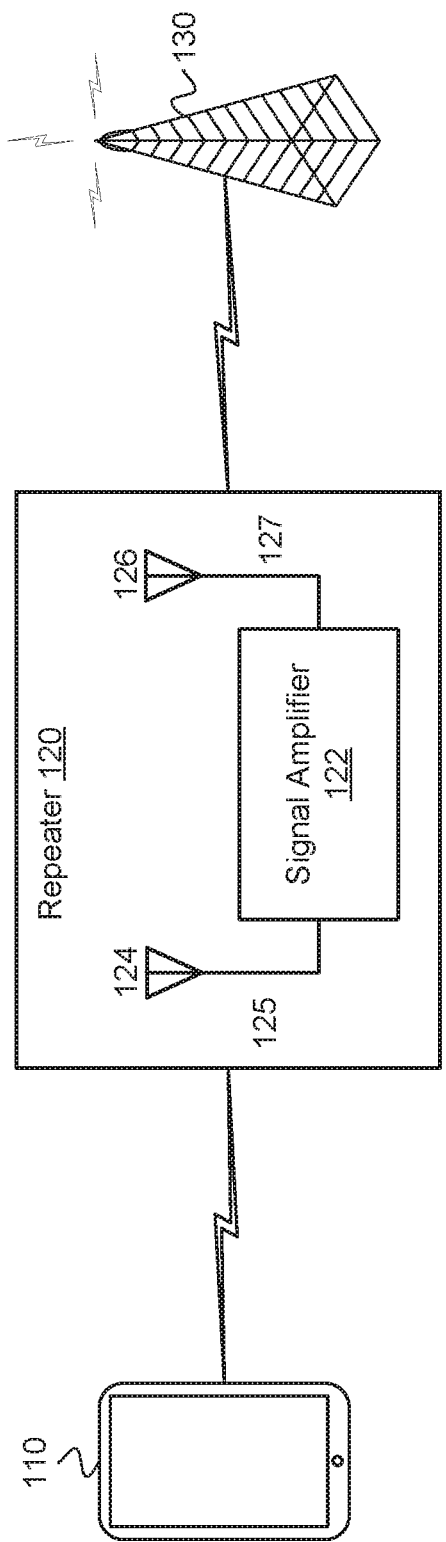
FIG. 2 illustrates a repeater in communication with a user equipment (UE) and a base station (BS) in accordance with an example.

FIG. 2 illustrates an exemplary repeater 120 in communication with a wireless device 110 and a base station 130. The repeater 120 (also referred to as a cellular signal amplifier) can enhance the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the repeater 120 can amplify or boost uplink signals and/or downlink signals bi-directionally. In one example, the repeater 120 can be at a fixed location, such as in a home or office. Alternatively, the repeater 120 can be attached to a mobile object, such as a vehicle or a wireless device 110. The repeater can be a signal booster, such as a cellular signal booster.

In one configuration, the repeater 120 can be configured to be connected to a device antenna 124 (e.g., an inside antenna, server antenna, or a coupling antenna) and a node antenna 126 (e.g., an outside antenna or donor antenna). The node antenna 126 can receive the downlink signal from the base station 130. The downlink signal can be provided to the signal amplifier 122 via a second coaxial cable 127 or other type of wired, wireless, optical, or radio frequency connection operable to communicate radio frequency signals. The signal amplifier 122 can include one or more radio signal amplifiers for amplification and filtering of cellular signals. The downlink signal that has been amplified and filtered can be provided to the device antenna 124 via a first coaxial cable 125 or other type of radio frequency connection operable to communicate radio frequency signals. The device antenna 124 can communicate the downlink signal that has been amplified and filtered to the wireless device 110.

Similarly, the device antenna 124 can receive an uplink signal from the wireless device 110. The uplink signal can be provided to the signal amplifier 122 via the first coaxial cable 125 or other type of wired, wireless, optical, or radio frequency connection operable to communicate radio frequency signals. The signal amplifier 122 can include one or more radio signal amplifiers for amplification and filtering of cellular signals. The uplink signal that has been amplified and filtered can be provided to the donor antenna 126 via the second coaxial cable 127 or other type of wired, wireless, optical, or radio frequency connection operable to communicate radio frequency signals. The donor antenna 126 can communicate the uplink signal that has been amplified and filtered to a node, such as base station 130.

In one embodiment, the server antenna 124 and the donor antenna 126 can be integrated as part of the repeater 120. Alternatively, the repeater 120 can be configured to be connected to a separate server antenna 124 or donor antenna 126. The server antenna and the donor antenna may be provided by a different provider than the repeater 120.

In one example, the repeater 120 can send uplink signals to a node and/or receive downlink signals from the node. While FIG. 2 shows the node as a base station 130, this is not intended to be limiting. The node can comprise a wireless wide area network (WWAN) access point (AP), a base station (BS), an evolved Node B (eNB), a next generation Node B (gNB), a New Radio base station (NR BS), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the repeater 120 used to amplify the uplink and/or a downlink signal can be a handheld booster. The handheld booster can be implemented in a sleeve of the wireless device 110. The wireless device sleeve may be attached to the wireless device 110, but may be removed as needed. In this configuration, the repeater 120 can automatically power down or cease amplification when the wireless device 110 approaches a particular base station. In other words, the repeater 120 may determine to stop performing signal amplification when the quality of uplink and/or downlink signals is above a defined threshold based on a location of the wireless device 110 in relation to the base station 130.

In one example, the repeater 120 can include a battery to provide power to various components, such as the signal amplifier 122, the device antenna 124, and the node antenna 126. The battery can also power the wireless device 110 (e.g., phone or tablet). Alternatively, the repeater 120 can receive power from the wireless device 110.

In one configuration, the repeater 120 can be a Federal Communications Commission (FCC)-compatible consumer repeater. As a non-limiting example, the repeater 120 can be compatible with FCC Part 20 or 47 Code of Federal Regulations (C.F.R.) Part 20.21 (Mar. 21, 2013). In addition, the handheld booster can operate on the frequencies used for the provision of subscriber-based services under parts 22 (Cellular), 24 (Broadband PCS), 27 (AWS-1, 700 megahertz (MHz) Lower A-E Blocks, and 700 MHz Upper C Block), and 90 (Specialized Mobile Radio) of 47 C.F.R. The repeater 120 can be configured to automatically self-monitor its operation to ensure compliance with applicable noise and gain limits. The repeater 120 can either self-correct or shut down automatically if the repeater's operations violate the regulations defined in 47 CFR Part 20.21. While a repeater that is compatible with FCC regulations is provided as an example, it is not intended to be limiting. The repeater can be configured to be compatible with other governmental regulations based on the location where the repeater is configured to operate.

In one configuration, the repeater 120 can enhance the wireless connection between the wireless device 110 and the base station 130 (e.g., cell tower) or another type of wireless wide area network (WWAN) access point (AP) by amplifying desired signals relative to a noise floor. The repeater 120 can boost signals for cellular standards, such as the Third Generation Partnership Project (3GPP) Long Term Evolution (LTE) Release 8, 9, 10, 11, 12, 13, 14, 15 or 16, 3GPP 5G Release 15 or 16, or Institute of Electronics and Electrical Engineers (IEEE) 802.16. In one configuration, the repeater 120 can boost signals for 3GPP LTE Release 16.0.0 (January 2019) or other desired releases.

The repeater 120 can boost signals from the 3GPP Technical Specification (TS) 36.101 (Release 16 Jul. 2019) bands or LTE frequency bands. For example, the repeater 120 can boost signals from the LTE frequency bands: 2, 4, 5, 12, 13, 17, 25, and 26. In addition, the repeater 120 can boost selected frequency bands based on the country or region in which the repeater is used, including any of bands 1-85 or other bands, as disclosed in 3GPP TS 36.104 V16.0.0 (January 2019), and depicted in Table 1:

TABLE 1

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, NOTE 4) |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |

TABLE 1-continued

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 67 | N/A | 738 MHz-758 MHz | FDD (NOTE 2) |
| 68 | 698 MHz-728 MHz | 753 MHz-783 MHz | FDD |
| 69 | N/A | 2570 MHz-2620 MHz | FDD (NOTE 2) |
| 70 | 1695 MHz-1710 MHz | 1995 MHz-2020 MHz | FDD[6] |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD (NOTE 2) |
| 76 | N/A | 1427 MHz-1432 MHz | FDD (NOTE 2) |
| 85 | 698 MHz-716 MHz | 728 MHz-746 MHz | FDD |
| 87 | 410 MHz-415 MHz | 420 MHz-425 MHz | FDD |
| 88 | 412 MHz-417 MHz | 422 MHz-427 MHz | FDD |

NOTE 1:
Band 6, 23 are not applicable.
NOTE 2:
Restricted to E-UTRA operation when carrier aggregation is configured. The downlink operating band is paired with the uplink operating band (external) of the carrier aggregation configuration that is supporting the configured Pcell.
NOTE 3:
This band is an unlicensed band restricted to licensed-assisted operation using Frame Structure Type 3.
NOTE 4:
Band 46 is divided into four sub-bands as in Table 5.5-1A.
NOTE 5:
The range 2180-2200 MHz of the DL operating band is restricted to E-UTRA operation when carrier aggregation is configured.
NOTE 6:
The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.
NOTE 7:
Void
NOTE 8:
This band is restricted to licensed-assisted operation using Frame Structure Type 3.

In another configuration, the repeater 120 can boost signals from the 3GPP Technical Specification (TS) 38.104 (Release 16 Jul. 2019) bands or 5G frequency bands. In addition, the repeater 120 can boost selected frequency bands based on the country or region in which the repeater is used, including any of bands n1-n86 in frequency range 1 (FR1), n257-n261 in frequency range 2 (FR2), or other bands, as disclosed in 3GPP TS 38.104 V16.0.0 (July 2019), and depicted in Table 2 and Table 3:

TABLE 2

| NR operating band | Uplink (UL) operating band BS receive/ UE transmit $F_{UL,\ low}$-$F_{UL,\ high}$ | Downlink (DL) operating band BS transmit/ UE receive $F_{DL,\ low}$-$F_{DL,\ high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| [n90] | 2496 MHz-2690 MHz | 2496 MHz-2690 MHz | TDD |

TABLE 3

| NR operating band | Uplink (UL) and Downlink (DL) operating band BS transmit/receive UE transmit/receive $F_{UL,\ low}$-$F_{UL,\ high}$ $F_{DL,\ low}$-$F_{DL,\ high}$ | Duplex Mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

The number of LTE or 5G frequency bands and the level of signal enhancement can vary based on a particular wireless device, cellular node, or location. Additional domestic and international frequencies can also be included to offer increased functionality. Selected models of the repeater 120 can be configured to operate with selected frequency bands based on the location of use. In another example, the repeater 120 can automatically sense from the wireless device 110 or base station 130 (or GPS, etc.) which frequencies are used, which can be a benefit for international travelers.

Figure 3:
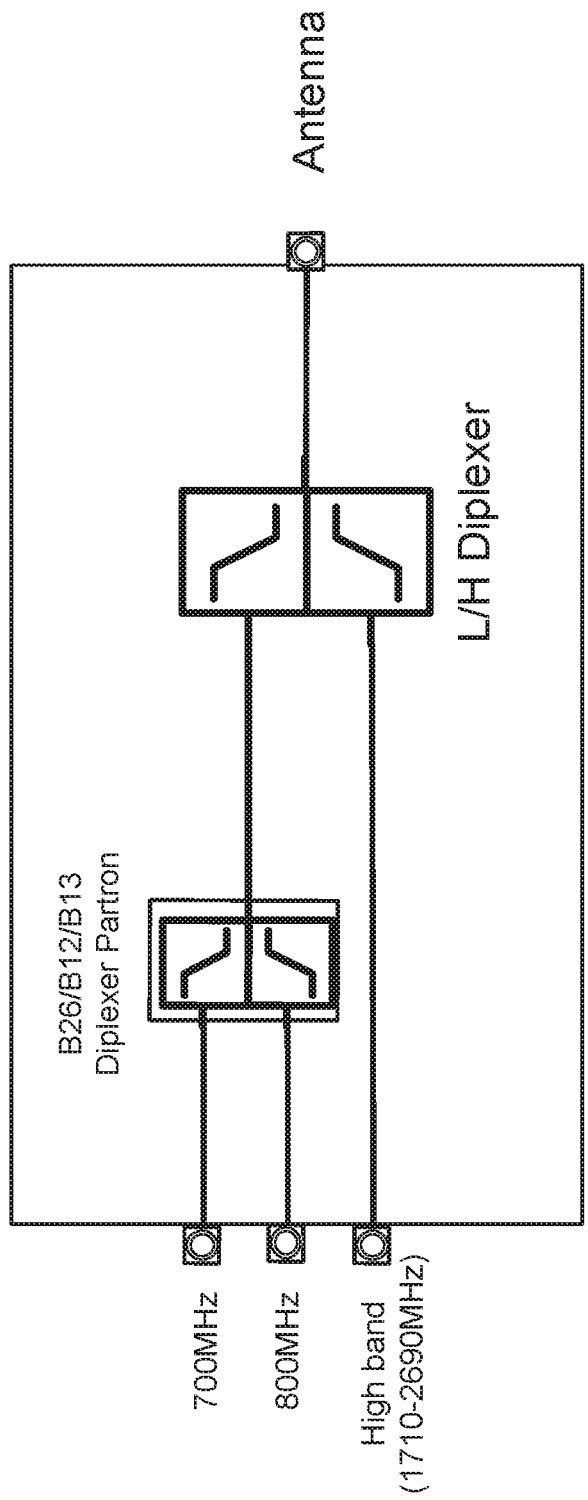
FIG. 3 illustrates a fixed antenna port triplexer, in accordance with an example.

FIG. 3 illustrates a fixed antenna port triplexer. The fixed antenna port can comprise a first-band port, a second-band port and a third-band port. In one embodiment, a first band amplification and filtering path can be coupled to the first-band port via a first path of a first multiplexer, wherein the multiplexer is one or more of a diplexer (e.g., a low band/high band (L/H) diplexer), a triplexer, a quadplexer, a quintplexer, a hexplexer, or another desired type of multiplexer. A second-band amplification and filtering path can be coupled to the second-band port via a first path of a second multiplexer and coupled to the first multiplexer via a second path of the first multiplexer. A third-band amplification and filtering path can be coupled to a second path of the second multiplexer, and a second path of the first multiplexer. The output of the first multiplexer can be communicatively coupled to one or more antennas. In one example, the first-band port or high-band port can be configured for a frequency range of a minimum of 1710 Megahertz (MHz) and a maximum of 2690 MHz. The second-band port can be configured for an of 800 MHz frequency band. And the third band-port can be configured for a 700 MHz frequency band. The actual frequencies and bands output from the three ports of the triplexer are dependent on the selection of the two multiplexers. In another example, the multiplexers can be configured for one or more of 3GPP LTE bands B26, B12, and B13.

Figure 4:
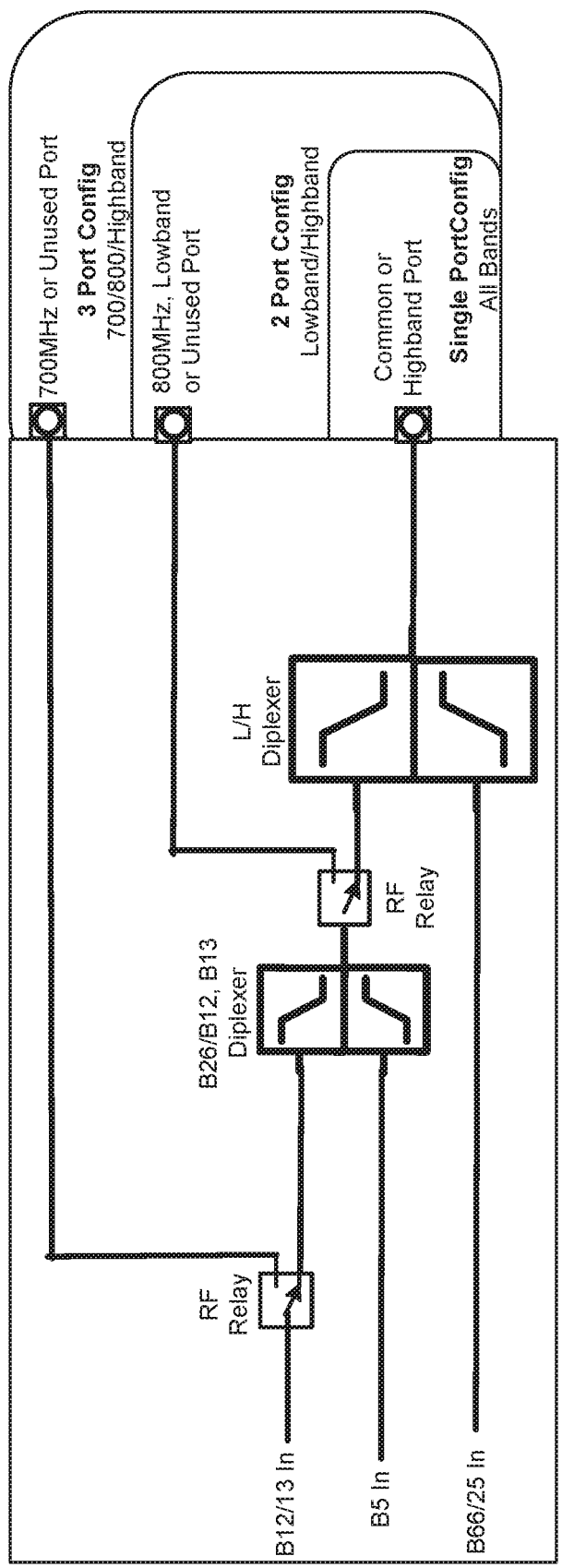
FIG. 4 illustrates a switched triplexer with a two relay (or switch) configuration, in accordance with an example.

FIG. 4 illustrates a switched triplexer. The triplexer can be configured to provide functionality of a bi-directional frequency division duplex (FDD) to time division duplex (TDD) repeater having a switchable antenna port. The switchable triplexer can allow a repeater system to have a single output, two outputs, or three outputs, in this example. This can allow an installer to use one antenna, two antennas, or three antennas, depending on the installation needs of a system and the location of the system install relative to different base stations. The use of multiple antennas can be helpful in using a directional antenna to provide higher gain to a selected base station, providing greater isolation between certain bands, and helping to reduce the risk of oscillation occurring in the repeater.

In the example of FIG. 4, an antenna port, such as a donor antenna port can be communicatively coupled to one or more of a common or high-band port that can transmit and receive signals in a first frequency range, a low band port (or unused port) that can transmit and receive signals in a second frequency range, or a third port (or unused port) that can transmit and receive signals in a third frequency range.

In one example, the first frequency range can include the second and third frequency ranges. The second frequency range can include the third frequency range. This allows signals in the first second and third frequency ranges to be sent to the first port, signals in the second and third frequency range to be sent to the second port, and a signal in the third frequency range to be sent to the third port.

In one example, the common port can be configured to transmit and receive signals in 3GPP LTE bands 5, 12, 13, 25, and 66. Alternatively, signals in bands 5, 12, and 13 can be switched to the second port, referred to as a low-band port. Alternatively, signals in bands 12 and 13 can be switched to the third port, with a signal in band 5 at the second port, and signals in bands 25 and 66 at the common port.

There can be a first band amplification and filtering path coupled to the switchable common port via a first path of a first multiplexer. The triplexer can further comprise of a second band amplification and filtering path coupled to the switchable common port via second path of the first multiplexer, a first path of a first radio frequency (RF) switch, and a first path of a second multiplexer. The second band amplification and filtering path can also be configured to be coupled to the switchable second band port via a second path of the second multiplexer and a second path of the first RF switch. A third band amplification and filtering path can be coupled to the switchable common port via a first path of a second RF relay, the second path of the second multiplexer, a first path of the first RF relay and the second path of the first diplexer. In one example, the third band amplification and filtering path can be coupled to the switchable second-band port via the first path of the second RF switch, the second path of the second multiplexer, and the second path of the first RF switch. In one example, the third band amplification and filtering path can be coupled to the switchable third-band port via the second path of the second RF switch, to enable the bi-directional FDD or TDD repeater to operate with a switchable: single port output configuration, a two-port output configuration, or a three-port output configuration for the signals carried by the first-band amplification and filtering path, the second-band amplification and filtering path, and third-band amplification and filtering path.

In one embodiment, the second-band amplification and filtering path can be coupled to one or more of a repeater port, a gain block, a first-band pass filter (BPF), a low noise amplifier (LNA) a variable gain power amplifier, a fixed power amplifier or a variable attenuator.

In one embodiment, the third-band amplification and filtering path can be coupled to one or more of a repeater port, a gain block, a first-band pass filter (BPF), a low noise amplifier (LNA) a variable gain power amplifier, a fixed power amplifier or a variable attenuator.

In one embodiment, the triplexer can be comprised of a controller configured to switch the second-band amplification and filtering path between the switchable common port and the switchable second band port. The controller can switch the third-band amplification and filtering path between the switchable common port, the switchable second band port, and the switchable third band port. The controller can also be configured to enable a single port configuration, a two-port output configuration, or a three-port output configuration for the signals carried by the first band amplification and filtering path, the second band amplification and filtering path and a third band amplification and filtering path.

In one embodiment, the controller can be configured to adjust a signal output power level or a signal gain at the switchable common port, the switchable second-band port, or the switchable third-band port based on a switch position of one or more of the first RF relay and the second RF relay to provide a predetermined power level at each port based on known losses of passive components in the first-band amplification and filtering path, the second-band amplification and filtering path, and third-band amplification and filtering path.

In one embodiment, each of the first-band amplification and filtering path, the second-band amplification and filtering path, and third-band amplification and filtering path are operable to carry one or more RF bands.

In one example, the RF switch is one or more of, a solid-state (SS) RF switch, a micro electromechanical system (MEMS) RF switch, or an electromechanical RF switch.

In one embodiment the multiplexer of the repeater can be one or more of a diplexer, a triplexer, a quadplexer, a quintplexer, a hexplexer, or another desired type of multiplexer.

In one embodiment, the repeater can include a switchable antenna port module. The module can comprise of a switchable common port, a switchable second-band port, and a switchable third-band port. The module can include a first-band amplification and filtering path port coupled to the switchable common port via a first path of a first multiplexer. The module can include a second-band amplification and filtering path port. The second-band amplification and filtering path can be coupled to the switchable common port via a second path of the first multiplexer, a first path of a first radio frequency (RF) relay, and a first path of a second multiplexer or the switchable second-band port via a second path of the second multiplexer, and a second path of the first RF relay. The third band amplification and filtering module can be coupled to the switchable common port via a first path of a second RF relay, a second path of the second multiplexer, a first path of the first RF relay, and a second path of the first multiplexer. The third band amplification and filtering module can be coupled to the switchable second-band port via the first path of the second RF relay, the second path of the second multiplexer, and the second path of the first RF relay. The third band amplification and filtering module can be coupled to the switchable third-band port via the second path of the second RF relay.

In one embodiment of the antenna port module, the first-band amplification and filtering path port is configured to be coupled to a first-band amplification and filtering path of the repeater. Additionally, the second-band amplification and filtering path port is configured to be coupled to a second-band amplification and filtering path of the repeater. Further, the third-band amplification and filtering path port is configured to be coupled to a third-band amplification and filtering path of the repeater.

In one embodiment of the antenna port module, the module can further comprise a third RF relay and a fourth RF relay, wherein the third RF relay is coupled to the switchable second band port. The third RF relay can include a first path coupled to a second path of the first RF relay. The third RF relay can comprise a second path coupled to a second path of the fourth RF relay, wherein the fourth RF relay is coupled to the second-band amplification and filtering path port. The fourth RF relay can comprise a first path coupled to the first path of the second multiplexer.

In one embodiment of the antenna port module, the module can further comprise a third RF relay and a switchable fourth-band port, wherein the third RF relay is coupled to the switchable second band port. The third RF relay an comprise of a first path coupled to the first path of the second multiplexer; or a second path coupled to the switchable fourth-band port.

In one embodiment of the antenna port module, the module can further comprise a module identification to enable the repeater to adjust a gain level to provide a signal with a predetermined power level at one of the switchable common port, the switchable second-band port, or the switchable third-band port, to compensate for signal loss in the switchable front-end module based on a configuration of the switchable antenna port module and a switch position of one or more of the first RF relay and the second RF relay to provide a predetermined power level at each port based on known losses of passive components in the first-band amplification and filtering path, the second-band amplification and filtering path, and third-band amplification and filtering path. The predetermined power level can be determined based on a Federal Communications Commission (FCC) regulation or another governmental compliance and or regulatory body.

Figure 5:
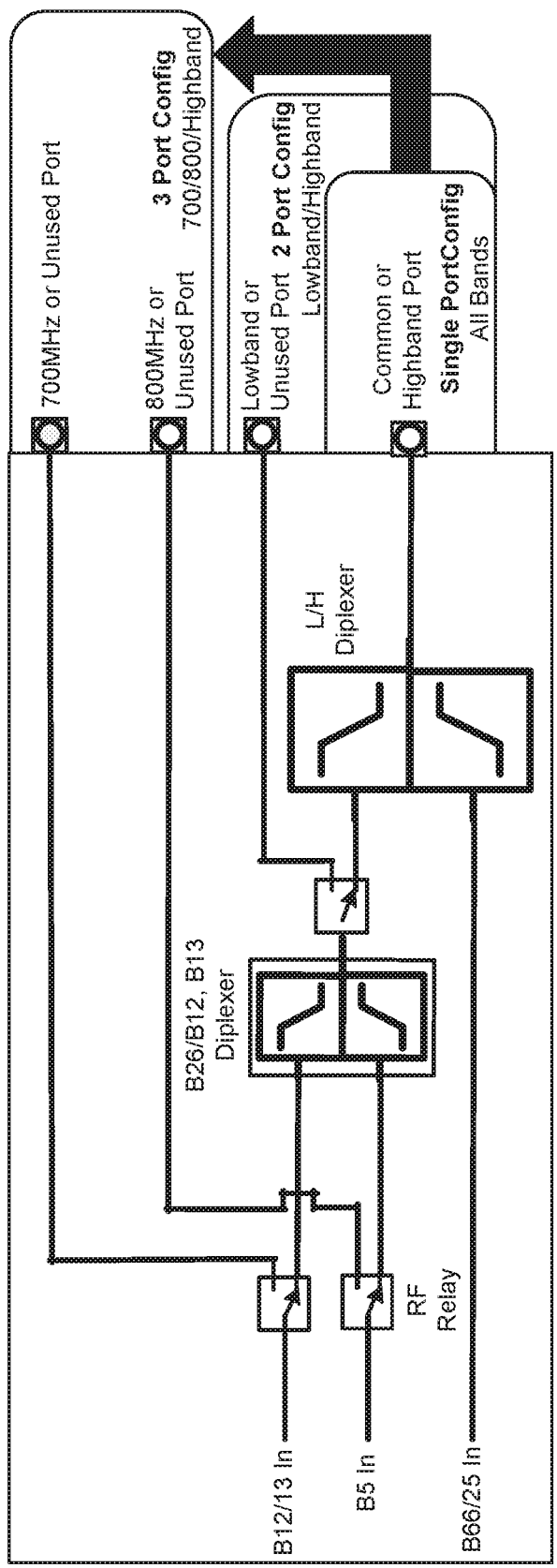
FIG. 5 illustrates a switched triplexer with a three relay (or switch) configuration, in accordance with an example.

FIG. 5 illustrates a switched triplexer, in a four-port output configuration. The triplexer can be configured to provide functionality of a bi-directional FDD or TDD repeater having a switchable antenna port. The switchable triplexer can allow a repeater system to have a single output, two outputs, or three outputs, in this example. This can allow an installer to use one antenna, two antennas, or three antennas, depending on the installation needs of a system and the location of the system install relative to different base stations. The use of multiple antennas can be helpful in using a directional antenna to provide higher gain to a selected base station, providing greater isolation between certain bands, and helping to reduce the risk of oscillation occurring in the repeater.

The antenna port, such as a donor antenna port, can be communicatively coupled to one or more of a common or high-band port that can transmit and receive signals in a first frequency range, a low band or unused port that can transmit and receive signals in a second frequency range, a third port that can transmit and receive signals in a third frequency range. In one configuration, a single port configuration can include all bands, utilizing the common port or high-band port. In another configuration, a two-port configuration can be configured to comprise of one or more the low-band port and the common or high-band port.

In one example, the first frequency range can include the second and third frequency ranges. The second frequency range can include the third frequency range. This allows signals in the first second and third frequency ranges to be sent to the first port, signals in the second and third frequency range to be sent to the second port, and a signal in the third frequency range to be sent to the third port.

In one example, the common port can be configured to transmit and receive signals in 3GPP LTE bands 5, 12, 13, 25, and 66. Alternatively, signals in bands 5, 12, and 13 can be switched to the second port, referred to as a low-band port. Alternatively, signals in bands 12 and 13 can be switched to the third port, with a signal in band 5 at the second port, and signals in bands 25 and 66 at the common port.

There can be a first band amplification and filtering path coupled to the switchable common port via a first path of a first multiplexer. The multiplexer can further comprise of a second band amplification and filtering path coupled to a first path of a third RF switch/relay, the switchable common port via second path of the first multiplexer, a first path of a first radio frequency (RF) switch, and a first path of a second multiplexer. The second band amplification and filtering path can also be configured to be coupled to the switchable second band port via a second path of the second multiplexer and a second path of the first RF relay. The second band amplification and filtering path can also be configured to be coupled to a switchable third band port (800 MHz port) via a second path of the third RF relay/switch. A third band amplification and filtering path can be coupled to the switchable common port via first path of a second RF relay, the second path of the second multiplexer, a first path of the first RF relay and the second path of the first diplexer. In one example, the third band amplification and filtering path can be coupled to the switchable common port via a first path of a second RF relay, the second path of the second multiplexer, the first path of the first RF relay, and the second path of the first diplexer. In one example, the third band amplification and filtering path can be coupled to the switchable second-band port via the first path of the second RF switch, the second path of the second multiplexer, and the second path of the first RF switch. In one example, the third band amplification and filtering path can be coupled to the switchable fourth-band port via the second path of the second RF switch, to enable the bi-directional FDD or TDD repeater to operate with a switchable: single port output configuration, a two-port output configuration, or a three-port output configuration for the signals carried by the first-band amplification and filtering path, the second-band amplification and filtering path, and the third-band amplification and filtering path.

In one embodiment, the repeater can include a third RF relay and a switchable fourth-band port. Wherein the third RF relay is coupled to the switchable second band port. The third RF relay comprises of a first path coupled to the first path of the second multiplexer, or a second path coupled to the switchable fourth-band port.

Figure 6:
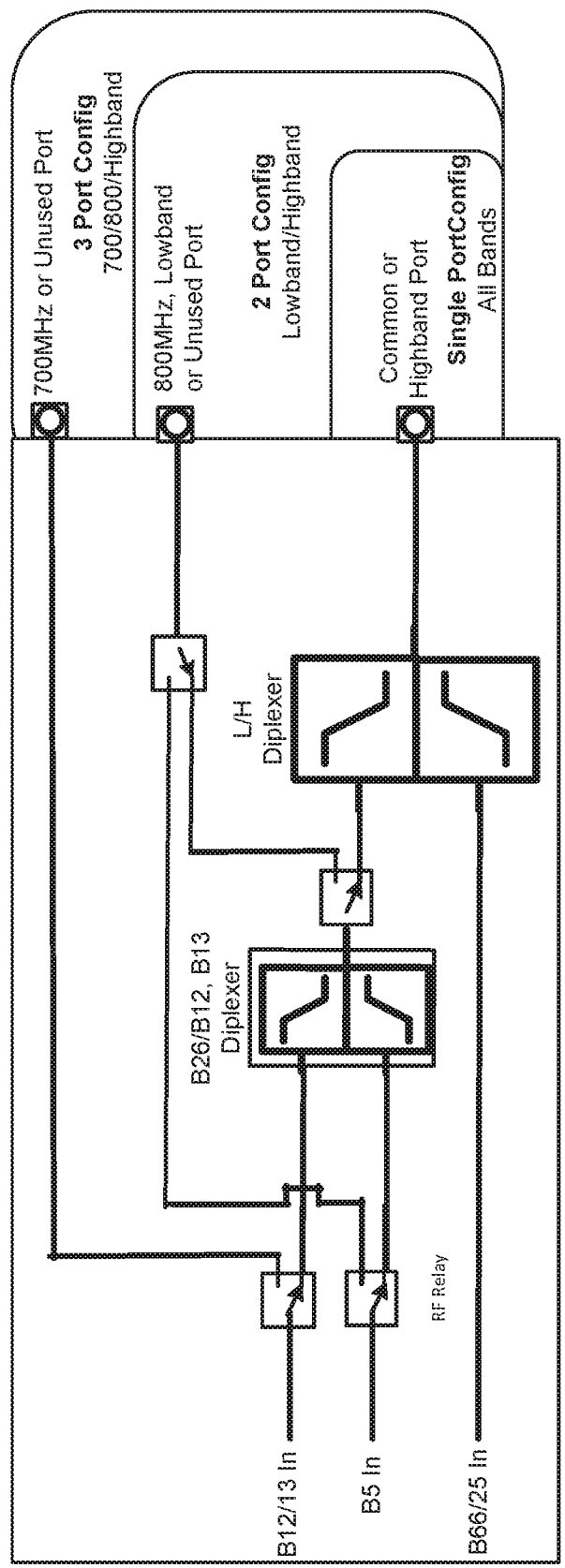
FIG. 6 illustrates a switched antenna port with a four relay (or switch) configuration, in accordance with an example.

FIG. 6 illustrates a switched antenna port, in a three-port configuration. The antenna port can be communicatively coupled to one or more of a common or high-band port that can transmit and receive signals in a first frequency range, a second band port comprising of a low band or unused port that can transmit and receive signals in a second frequency range, a third port (or unused port) that can transmit and receive signals in a third frequency range.

In one example, the first frequency range can include the second and third frequency ranges. The second frequency range can include the third frequency range. This allows signals in the first second and third frequency ranges to be sent to the first port, signals in the second and third frequency range to be sent to the second port, and a signal in the third frequency range to be sent to the third port.

In one example, the common port can be configured to transmit and receive signals in 3GPP LTE bands 5, 12, 13, 25, and 66. Alternatively, signals in bands 5, 12, and 13 can be switched to the second port, referred to as a low-band port. Alternatively, signals in bands 12 and 13 can be switched to the third port, with a signal in band 5 at the second port, and signals in bands 25 and 66 at the common port.

In one configuration, a single port configuration can include all bands, utilizing the common port or high-band port. In another configuration, a two port configuration can be configured to comprise of one or more the low-band port and the common or high-band port. In one configuration, a three-port configuration can be configured to comprise of one or more of the common or high-band port, the second band port/800 MHz port and the third-band port/700 MHz port. There can be a first band amplification and filtering path coupled to the switchable common port via a first path of a first multiplexer. The multiplexer can further comprise of a second band amplification and filtering path coupled to a first path of a third RF switch/relay, the switchable common port via second path of the first multiplexer, a first path of a first radio frequency (RF) switch, and a first path of a second multiplexer. The second band amplification and filtering path can also be configured to be coupled to the switchable second band port via a second path of the first RF relay and the second path of the fourth RF relay. The multiplexer can also comprise of a second band amplification and filtering path configured to be coupled to the switchable second band port via a first path of the third RF relay, a first path of the second multiplexer, the second path of the first RF relay and the first path of the fourth RF relay. A third band amplification and filtering path can be coupled to the switchable common port via first path of a second RF relay, the second path of the second multiplexer, a first path of the first RF relay and the second path of the first diplexer.

In one example, the third band amplification and filtering path can be coupled to the switchable second-band port via the first path of the second RF switch, the second path of the second multiplexer, the second path of the first RF switch and the first path of the fourth RF switch.

In one example, the third band amplification and filtering path can be coupled to the switchable third-band port via the second path of the second RF switch, to enable the bi-directional FDD or TDD repeater to operate with a switchable: single port output configuration, a two-port output configuration, or a three-port output configuration for the signals carried by the first-band amplification and filtering path, the second-band amplification and filtering path, and third-band amplification and filtering path.

In one embodiment, the repeater can include a third RF relay and a fourth RF relay, wherein the third RF relay is coupled to the switchable second band port. The third relay can comprise of a first path coupled to a second path of the first RF relay or a second path coupled to a second path of the fourth RF relay. Wherein, the fourth RF relay is coupled to the second-band amplification and filtering path and further comprises a first path coupled to the first path of the second multiplexer.

Figure 7:
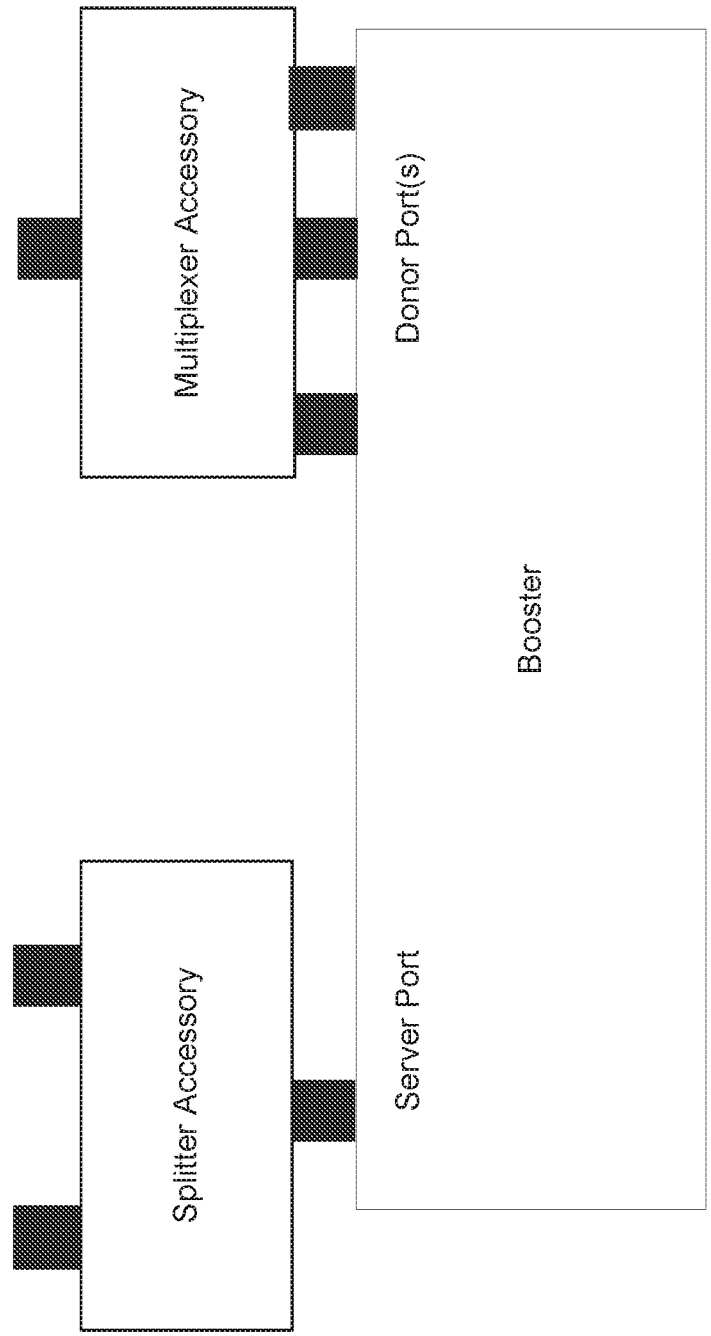
FIG. 7 illustrates a booster comprising a splitter and multiplexer accessory, in accordance with an example.

FIG. 7 illustrates a repeater (signal booster) comprising a splitter accessory and a multiplexer accessory. While the splitter accessory shows two ports, and the multiplexer accessory shows three ports, this is not intended to be limiting. Both accessories can include up to n ports. In one example, a repeater can detect and account for signal loss in passive accessories such as multiplexers and diplexers, connectors, resistors, or even splitters and/or combiners. The repeater can adjust, via an increase or decrease in the gain of a selected amplification and filtering path, and provide power to meet maximum limits at the output port that accounts for losses in the accessory due to passive components.

In one example detection methods can be implemented within a booster or repeater system to allow losses due to passive components in an accessory, such as the splitter accessory or the switchable multiplexer accessory, to be accounted for. In one example, the accessory can include shunt resistors. The repeater can apply a signal having a voltage onto the connectors of the accessory and measures the voltage. In some embodiments, different resistor values on one or more ports could be used to identify the accessory.

The configuration of such examples and embodiments provides the repeater with the ability to compensate for known losses in an accessory that are caused by passive components. Alternatively, each accessory may be identified using another digital or analog means, and the information can be communicated to the repeater when the accessory is connected or powered up. For example, calibrated loss information may be stored at the accessory, and communicated to a repeater. Alternatively, the accessory can include an identification. The identification can be communicated to a repeater and used in a look up table to identify calibrated losses for the accessory. This information can be used to identify losses in the accessory caused by passive components to allow the repeater to compensate for the losses and output a maximum signal power allowed by a federal or governing body, such as the US. Federal Communication Commission (FCC).

In one example, the bi-directional repeater can comprise a splitter accessory having a first port operable to be connected to a server port of the bi-directional repeater, the splitter accessory having a second port, a third port, and an nth port configured to carry n split signals from the server port or to combine n signals to the server port. A controller can be configured to adjust a signal output power level or a signal gain at one or more of the n ports to provide a predetermined power level at one or more of the n ports based on known losses of passive components in the splitter accessory. The controller can adjust the signal output power level or the signal gain at one or more of the n ports or the splitter accessory based on one or more of: measured losses in passive components of the splitter accessory; or predetermined losses in the passive components of the splitter accessory.

In one embodiment, there can be a variation configured to include the accessory function incorporated into the booster. For example, the switchable triplexer illustrated in the examples of FIG. 4-6 can be incorporated in a repeater. In one embodiment, the booster can switch the accessory function in or out depending on whether one cable is attached to the donor port or multiple cables are attached to the switchable donor ports. In some embodiments, one or more donor ports can be separated to be communicatively coupled to one or more antennas. In another embodiment, one or more server ports can be combined in order to be communicatively coupled to one or more antennas.

Figure 8:
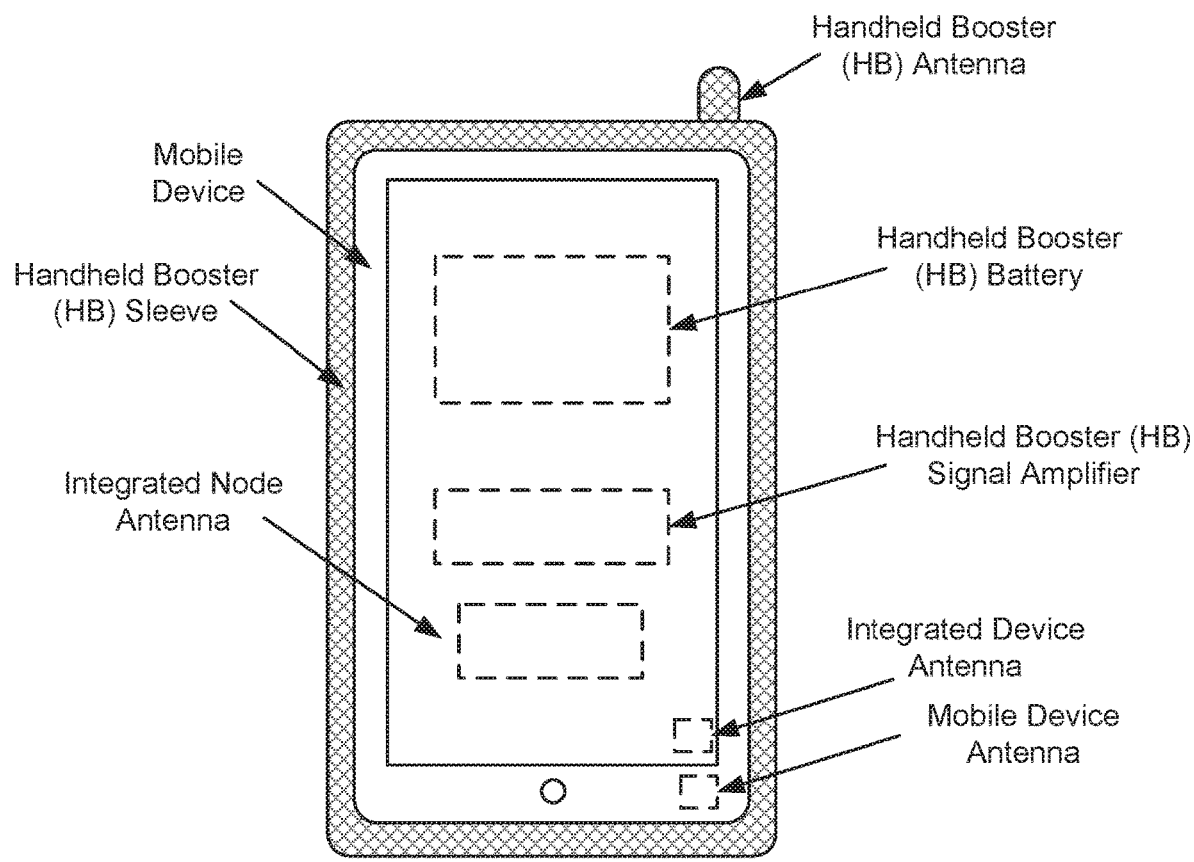
FIG. 8 illustrates a handheld booster in communication with a wireless device in accordance with an example.

While various embodiments described herein, and illustrated in FIGS. 1-7, have been described with respect to a cellular signal amplifier with an outside antenna and an inside antenna, this is not intended to be limiting. A repeater with multiplexed radio frequency (RF) paths can also be accomplished using a handheld booster, as illustrated in FIG. 8. The handheld booster can include an integrated device antenna and an integrated node antenna that are typically used in place of the indoor antenna and outdoor antenna, respectively.

Figure 9:
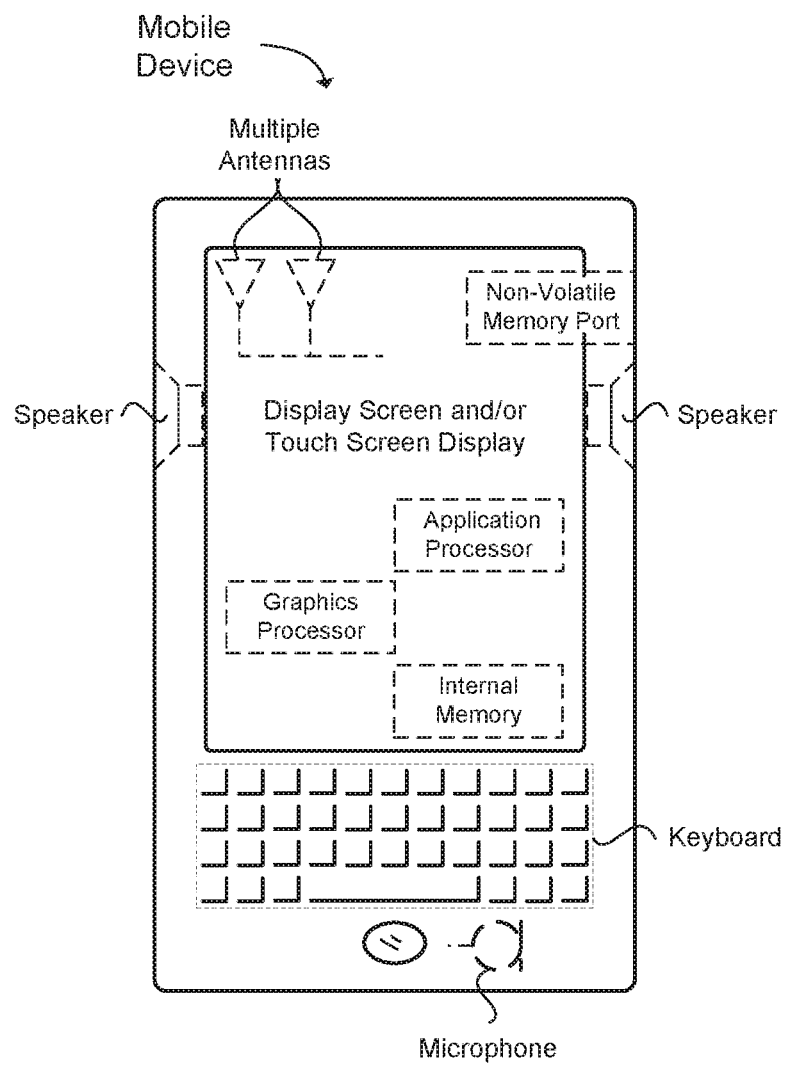
FIG. 9 illustrates a user equipment (UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes a bi-directional repeater having a switchable antenna port, comprising: a switchable common port; a switchable second-band port; a switchable third-band port; a first-band amplification and filtering path coupled to the switchable common port via a first path of a first multiplexer; a second-band amplification and filtering path coupled to one of: the switchable common port via a second path of the first multiplexer, a first path of a first radio frequency (RF) switch, and a first path of a second multiplexer; or the switchable second-band port via a second path of the second multiplexer, and a second path of the first RF switch; a third band amplification and filtering path coupled to: the switchable common port via a first path of a second RF switch, the second path of the second multiplexer, the first path of the first RF switch, and the second path of the first diplexer; or the switchable second-band port via the first path of the second RF switch, the second path of the second multiplexer, and the second path of the first RF switch; or the switchable third-band port via the second path of the second RF switch, to enable the bi-directional repeater to operate with a switchable: single port output configuration, a two-port output configuration, or a three-port output configuration for the signals carried by the first-band amplification and filtering path, the second-band amplification and filtering path, and third-band amplification and filtering path.

Example 2 includes the bi-directional repeater having the switchable front end of Example 1, wherein the first-band amplification and filtering path is further coupled to: a repeater port; a gain block; a first-band pass filter (BPF); a low noise amplifier (LNA); a variable gain power amplifier; a fixed gain power amplifier; or a variable attenuator.

Example 3 includes the bi-directional repeater having the switchable front end of any of Examples 1 to 2, wherein the second-band amplification and filtering path is further coupled to: a repeater port; a gain block; a second-band pass filter (BPF); a low noise amplifier (LNA); a variable gain power amplifier; a fixed gain power amplifier; or a variable attenuator.

Example 4 includes the bi-directional repeater having the switchable front end of any of Examples 1 to 3, wherein the third-band amplification and filtering path is further coupled to: a repeater port; a gain block; a third-band pass filter (BPF); a low noise amplifier (LNA); a variable gain power amplifier; a fixed gain power amplifier; or a variable attenuator.

Example 5 includes the bi-directional repeater having the switchable front end of any of Examples 1 to 4, further comprising: a third RF switch; and a fourth RF switch; wherein the third RF switch is coupled to the switchable second band port and further comprises: a first path coupled to a second path of the first RF switch; or a second path coupled to a second path of the fourth RF switch; wherein the fourth RF switch is coupled to the second-band amplification and filtering path and further comprises: a first path coupled to the first path of the second multiplexer.

Example 6 includes the bi-directional repeater having the switchable front end of any of Examples 1 to 5, further comprising: a third RF switch; and a switchable fourth-band port; wherein the third RF switch is coupled to the switchable second band port and further comprises: a first path coupled to the first path of the second multiplexer; or a second path coupled to the switchable fourth-band port.

Example 7 includes the bi-directional repeater having the switchable front end of any of Examples 1 to 6, further comprising: a controller configured to: switch the second-band amplification and filtering path between the switchable common port and the switchable second band port; and switch the third-band amplification and filtering path between the switchable common port, the switchable second band port, and the switchable third band port; enable a single port output configuration, a two-port output configuration, or a three-port output configuration for the signals carried by the first-band amplification and filtering path, the second-band amplification and filtering path, and third-band amplification and filtering path.

Example 8 includes the bi-directional repeater having the switchable front end of any of Examples 1 to 7, wherein the controller is further configured to: adjust a signal output power level or a signal gain at the switchable common port, the switchable second-band port, or the switchable third-band port based on a switch position of one or more of the first RF switch and the second RF switch to provide a predetermined power level at each port based on known losses of passive components in the first-band amplification and filtering path, the second-band amplification and filtering path, and third-band amplification and filtering path.

Example 9 includes the bi-directional repeater having the switchable front end of any of Examples 1 to 8, wherein each of the first-band amplification and filtering path, the second-band amplification and filtering path, and third-band amplification and filtering path are operable to carry one or more RF bands.

Example 10 includes the bi-directional repeater having the switchable front end of any of Examples 1 to 9, wherein the RF switch is one or more of a RF switch, a solid-state (SS) RF switch, a micro electromechanical system (MEMS) RF switch, or a electromechanical RF switch.

Example 11 includes the bi-directional repeater having the switchable front end of any of Examples 1 to 10, wherein the multiplexer is one or more of a diplexer, a triplexer, a quadplexer, a quintplexer, or a hexplexer.

Example 12 includes a switchable antenna port module for a repeater, comprising: a switchable common port; a switchable second-band port; a switchable third-band port; a first-band amplification and filtering path port coupled to the switchable common port via a first path of a first multiplexer; a second-band amplification and filtering path port coupled to one of: the switchable common port via a second path of the first multiplexer, a first path of a first radio frequency (RF) switch, and a first path of a second multiplexer; or the switchable second-band port via a second path of the second multiplexer, and a second path of the first RF switch; a third band amplification and filtering path port coupled to: the switchable common port via a first path of a second RF switch, a second path of the second multiplexer, a first path of the first RF switch, and a second path of the first multiplexer; or the switchable second-band port via the first path of the second RF switch, the second path of the second multiplexer, and the second path of the first RF switch; or the switchable third-band port via the second path of the second RF switch.

Example 13 includes the switchable antenna port module for the repeater of Example 12, wherein: the switchable common port is configured to be coupled to a first antenna; the switchable second-band port is configured to be coupled to a second antenna; and the switchable third-band port is configured to be coupled to a third antenna.

Example 14 includes the switchable antenna port module for the repeater of any of Examples 12 to 13, wherein: the first-band amplification and filtering path port is configured to be coupled to a first-band amplification and filtering path of the repeater; the second-band amplification and filtering path port is configured to be coupled to a second-band amplification and filtering path of the repeater; and the third-band amplification and filtering path port is configured to be coupled to a third-band amplification and filtering path of the repeater.

Example 15 includes the switchable antenna port module for the repeater of any of Examples 12 to 14, further comprising: a third RF switch; and a fourth RF switch; wherein the third RF switch is coupled to the switchable second band port and further comprises: a first path coupled to a second path of the first RF switch; or a second path coupled to a second path of the fourth RF switch; wherein the fourth RF switch is coupled to the second-band amplification and filtering path port and further comprises: a first path coupled to the first path of the second multiplexer.

Example 16 includes the switchable antenna port module for the repeater of any of Examples 12 to 15, further comprising: a third RF switch; and a switchable fourth-band port; wherein the third RF switch is coupled to the switchable second band port and further comprises: a first path coupled to the first path of the second multiplexer; or a second path coupled to the switchable fourth-band port.

Example 17 includes the switchable antenna port module for the repeater of any of Examples 12 to 16, further comprising: a controller configured to: switch the second-band amplification and filtering path port between the switchable common port and the switchable second band port;

and switch the third-band amplification and filtering path port between the switchable common port, the switchable second band port, and the switchable third band port.

Example 18 includes the switchable antenna port module for the repeater of any of Examples 12 to 17, further comprising: a controller configured to: switch a second-band signal input at the second-band amplification and filtering path port between the switchable common port and the switchable second band port; and switch a third-band signal input at the third-band amplification and filtering path port between the switchable common port, the switchable second band port, and the switchable third band port; enable a single port output configuration, a two-port output configuration, or a three-port output configuration for the signals input at the first-band amplification and filtering path port, the second-band amplification and filtering path port, and third-band amplification and filtering path port.

Example 19 includes the switchable antenna port module for the repeater of any of Examples 12 to 18, further comprising: a module identification to enable the repeater to adjust a gain level to provide a signal with a predetermined power level at one of the switchable common port, the switchable second-band port, or the switchable third-band port, to compensate for signal loss in the switchable front-end module based on a configuration of the switchable antenna port module and a switch position of one or more of the first RF switch and the second RF switch to provide a predetermined power level at each port based on known losses of passive components in the first-band amplification and filtering path, the second-band amplification and filtering path, and third-band amplification and filtering path.

Example 20 includes the switchable antenna port module for the repeater of any of Examples 12 to 19, wherein the first RF switch and the second RF switch is one or more of a RF switch, a solid-state (SS) RF switch, a micro electro-mechanical system (MEMS) RF switch, or a electromechanical RF switch.

Example 21 includes a bi-directional repeater having a switchable antenna port, comprising: a switchable common port; a switchable second-band port; a first-band amplification and filtering path coupled to the switchable common port via a first path of a first multiplexer; a second-band amplification and filtering path coupled to one of: the switchable common port via a second path of the first multiplexer, a first path of a first radio frequency (RF) switch, and a first path of a second multiplexer; or the switchable second-band port via a second path of the second multiplexer, and a second path of the first RF switch.

Example 22 includes the bi-directional repeater of Example 21, further comprising: a third band amplification and filtering path coupled to: the switchable common port, via a second path of the second multiplexer, a first path of the first RF switch, and a second path of the first multiplexer; or the switchable second-band port via the second path of the second multiplexer, and the second path of the first RF switch.

Example 23 includes the bi-directional repeater of any of Examples 21 to 22, further comprising: a switchable third-band port; the third band amplification and filtering path coupled to: the switchable common port via a first path of a second RF switch, the second path of the second multiplexer, the first path of the first RF switch, and the second path of the first multiplexer; or the switchable second-band port via the first path of the second RF switch, the second path of the second multiplexer, and the second path of the first RF switch; or the switchable third-band port via a second path of the second RF switch.

Example 24 includes the bi-directional repeater of any of Examples 21 to 23, wherein the RF switch is one or more of a RF switch, a solid-state (SS) RF switch, a micro electro-mechanical system (MEMS) RF switch, or a electromechanical RF switch.

Example 25 includes the bi-directional repeater of any of Examples 21 to 24, wherein the first-band amplification and filtering path is further coupled to: a repeater port; a gain block; a first-band pass filter (BPF); a low noise amplifier (LNA); a variable gain power amplifier; a fixed gain power amplifier; or a variable attenuator.

Example 26 includes the bi-directional repeater of any of Examples 21 to 25, wherein the second-band amplification and filtering path is further coupled to: a repeater port; a gain block; a second-band pass filter (BPF); a low noise amplifier (LNA); a variable gain power amplifier; a fixed gain power amplifier; or a variable attenuator.

Example 27 includes the bi-directional repeater of any of Examples 21 to 26, wherein each of the first-band amplification and filtering path, the second-band amplification and filtering path, and third-band amplification and filtering path are operable to carry one or more RF bands.

Example 28 includes a bi-directional repeater having a switchable antenna port, comprising: a switchable common port; a switchable second-band port; a first-band amplification and filtering path coupled to the switchable common port via a first path of a first multiplexer; a second-band amplification and filtering path coupled to one of: the switchable common port via a second path of the first multiplexer, a first path of a first radio frequency (RF) switch, and a first path of a second multiplexer; or the switchable second-band port via a second path of the second multiplexer, and a second path of the first RF switch.

Example 29 includes the bi-directional repeater of Example 28, further comprising: a third band amplification and filtering path coupled to: the switchable common port, via a second path of the second multiplexer, a first path of the first RF switch, and a second path of the first multiplexer; or the switchable second-band port via the second path of the second multiplexer, and the second path of the first RF switch; and a controller configured to adjust a signal output power level or a signal gain at the switchable common port, or the switchable second-band port, based on a switch position of the first RF switch to provide a predetermined power level at each port based on known losses of passive components in the first-band amplification and filtering path, and the second-band amplification and filtering path.

Example 30 includes the bi-directional repeater of any of Examples 28 to 29, wherein the controller is configured to adjust the signal output power level or the signal gain at the switchable common port or the switchable second-band port based on one or more of: measured losses in passive components of the first-band amplification and filtering path, and the second-band amplification and filtering path; or predetermined losses in the passive components of the first-band amplification and filtering path, and the second-band amplification and filtering path.

Example 31 includes the bi-directional repeater of any of Examples 28 to 30, wherein the first-band amplification and filtering path is further coupled to: a repeater port; a gain block; a first-band pass filter (BPF); a low noise amplifier (LNA); a variable gain power amplifier; a fixed gain power amplifier; or a variable attenuator.

Example 32 includes the bi-directional repeater of any of Examples 28 to 31, wherein the second-band amplification and filtering path is further coupled to: a repeater port; a gain block; a second-band pass filter (BPF); a low noise amplifier (LNA); a variable gain power amplifier; a fixed gain power amplifier; or a variable attenuator.

Example 33 includes the bi-directional repeater of any of Examples 28 to 32, further comprising: a splitter accessory having a first port operable to be connected to a server port of the bi-directional repeater, the splitter accessory having a second port, a third port, and an nth port configured to carry n split signals from the server port or to combine n signals to the server port; a controller configured to adjust a signal output power level or a signal gain at one or more of the n ports to provide a predetermined power level at one or more of the n ports based on known losses of passive components in the splitter accessory.

Example 34 includes the bi-directional repeater of any of Examples 28 to 33, wherein the controller is configured to adjust the signal output power level or the signal gain at one or more of the n ports or the splitter accessory based on one or more of: measured losses in passive components of the splitter accessory; or predetermined losses in the passive components of the splitter accessory.

Example 35 includes a bi-directional repeater having a switchable antenna port, comprising: a switchable common port; a switchable second-band port; a switchable third-band port; a first-band amplification and filtering path coupled to the switchable common port via a first path of a first multiplexer; a second-band amplification and filtering path coupled to one of: the switchable common port via a second path of the first multiplexer, a first path of a first radio frequency (RF) switch, and a first path of a second multiplexer; or the switchable second-band port via a second path of the second multiplexer, and a second path of the first RF switch; a third band amplification and filtering path coupled to: the switchable common port via a first path of a second RF switch, the second path of the second multiplexer, the first path of the first RF switch, and the second path of the first diplexer; or the switchable second-band port via the first path of the second RF switch, the second path of the second multiplexer, and the second path of the first RF switch; or the switchable third-band port via the second path of the second RF switch, to enable the bi-directional repeater to operate with a switchable: single port output configuration, a two-port output configuration, or a three-port output configuration for the signals carried by the first-band amplification and filtering path, the second-band amplification and filtering path, and third-band amplification and filtering path.

Example 36 includes the bi-directional repeater having the switchable front end of Example 35, wherein: the first-band amplification and filtering path is further coupled to: a repeater port; a gain block; a first-band pass filter (BPF); a low noise amplifier (LNA); a variable gain power amplifier; a fixed gain power amplifier; or a variable attenuator; the second-band amplification and filtering path is further coupled to: a repeater port; a gain block; a second-band pass filter (BPF); a low noise amplifier (LNA); a variable gain power amplifier; a fixed gain power amplifier; or a variable attenuator; and the third-band amplification and filtering path is further coupled to: a repeater port; a gain block; a third-band pass filter (BPF); a low noise amplifier (LNA); a variable gain power amplifier; a fixed gain power amplifier; or a variable attenuator, wherein each of the first-band amplification and filtering path, the second-band amplification and filtering path, and third-band amplification and filtering path are operable to carry one or more RF bands.

Example 37 includes the bi-directional repeater having the switchable front end of any of Examples 35 to 36, further comprising: a third RF switch; and a fourth RF switch; wherein the third RF switch is coupled to the switchable second band port and further comprises: a first path coupled to a second path of the first RF switch; or a second path coupled to a second path of the fourth RF switch; wherein the fourth RF switch is coupled to the second-band amplification and filtering path and further comprises: a first path coupled to the first path of the second multiplexer.

Example 38 includes the bi-directional repeater having the switchable front end of any of Examples 35 to 37, further comprising: a third RF switch; and a switchable fourth-band port; wherein the third RF switch is coupled to the switchable second band port and further comprises: a first path coupled to the first path of the second multiplexer; or a second path coupled to the switchable fourth-band port.

Example 39 includes the bi-directional repeater having the switchable front end of any of Examples 35 to 38, further comprising: a controller configured to: switch the second-band amplification and filtering path between the switchable common port and the switchable second band port; and switch the third-band amplification and filtering path between the switchable common port, the switchable second band port, and the switchable third band port; enable a single port output configuration, a two-port output configuration, or a three-port output configuration for the signals carried by the first-band amplification and filtering path, the second-band amplification and filtering path, and third-band amplification and filtering path.

Example 40 includes the bi-directional repeater having the switchable front end of any of Examples 35 to 39, wherein: the controller is further configured to: adjust a signal output power level or a signal gain at the switchable common port, the switchable second-band port, or the switchable third-band port based on a switch position of one or more of the first RF switch and the second RF switch to provide a predetermined power level at each port based on known losses of passive components in the first-band amplification and filtering path, the second-band amplification and filtering path, and third-band amplification and filtering path; each of the first-band amplification and filtering path, the second-band amplification and filtering path, and third-band amplification and filtering path are operable to carry one or more RF bands; or the RF switch is one or more of a RF switch, a solid-state (SS) RF switch, a micro electro-mechanical system (MEMS) RF switch, or a electromechanical RF switch; or the multiplexer is one or more of a diplexer, a triplexer, a quadplexer, a quintplexer, or a hexplexer.

Example 41 includes the bi-directional repeater having the switchable front end of any of Examples 35 to 40, further comprising: a controller is configured to adjust a signal output power level or the signal gain at the switchable common port or the switchable second-band port based on one or more of: measured losses in passive components of the first-band amplification and filtering path, and the second-band amplification and filtering path; or predetermined losses in the passive components of the first-band amplification and filtering path, and the second-band amplification and filtering path.

Example 42 includes the bi-directional repeater having the switchable front end of any of Examples 35 to 41, further comprising: a splitter accessory having a first port operable to be connected to a server port of the bi-directional repeater, the splitter accessory having a second port, a third port, and an nth port configured to carry n split signals from the server port or to combine n signals to the server port; and a controller configured to: adjust a signal output power level or a signal gain at one or more of the n ports to provide a predetermined power level at one or more of the n ports based on known losses of passive components in the splitter accessory; or adjust the signal output power level or the signal gain at one or more of the n ports or the splitter accessory based on one or more of: measured losses in passive components of the splitter accessory; or predetermined losses in the passive components of the splitter accessory.

Example 43 includes a switchable antenna port module for a repeater, comprising: a switchable common port; a switchable second-band port; a switchable third-band port; a first-band amplification and filtering path port coupled to the switchable common port via a first path of a first multiplexer; a second-band amplification and filtering path port coupled to one of: the switchable common port via a second path of the first multiplexer, a first path of a first radio frequency (RF) switch, and a first path of a second multiplexer; or the switchable second-band port via a second path of the second multiplexer, and a second path of the first RF switch; a third band amplification and filtering path port coupled to: the switchable common port via a first path of a second RF switch, a second path of the second multiplexer, a first path of the first RF switch, and a second path of the first multiplexer; or the switchable second-band port via the first path of the second RF switch, the second path of the second multiplexer, and the second path of the first RF switch; or the switchable third-band port via the second path of the second RF switch.

Example 44 includes the switchable antenna port module for the repeater of Example 43, wherein: the switchable common port is configured to be coupled to a first antenna; the switchable second-band port is configured to be coupled to a second antenna; and the switchable third-band port is configured to be coupled to a third antenna.

Example 45 includes the switchable antenna port module for the repeater of any of Examples 43 to 44, wherein: the first-band amplification and filtering path port is configured to be coupled to a first-band amplification and filtering path of the repeater; the second-band amplification and filtering path port is configured to be coupled to a second-band amplification and filtering path of the repeater; and the third-band amplification and filtering path port is configured to be coupled to a third-band amplification and filtering path of the repeater.

Example 46 includes the switchable antenna port module for the repeater of any of Examples 43 to 45, further comprising: a third RF switch; and a fourth RF switch; wherein the third RF switch is coupled to the switchable second band port and further comprises: a first path coupled to a second path of the first RF switch; or a second path coupled to a second path of the fourth RF switch; wherein the fourth RF switch is coupled to the second-band amplification and filtering path port and further comprises: a first path coupled to the first path of the second multiplexer.

Example 47 includes the switchable antenna port module for the repeater of any of Examples 43 to 46, further comprising: a third RF switch; and a switchable fourth-band port; wherein the third RF switch is coupled to the switchable second band port and further comprises: a first path coupled to the first path of the second multiplexer; or a second path coupled to the switchable fourth-band port.

Example 48 includes the switchable antenna port module for the repeater of any of Examples 43 to 47, further comprising: a controller configured to: switch the second-band amplification and filtering path port between the switchable common port and the switchable second band port; and switch the third-band amplification and filtering path port between the switchable common port, the switchable second band port, and the switchable third band port; and a module identification to enable the repeater to adjust a gain level to provide a signal with a predetermined power level at one of the switchable common port, the switchable second-band port, or the switchable third-band port, to compensate for signal loss in the switchable front-end module based on a configuration of the switchable antenna port module and a switch position of one or more of the first RF switch and the second RF switch to provide a predetermined power level at each port based on known losses of passive components in the first-band amplification and filtering path, the second-band amplification and filtering path, and third-band amplification and filtering path.

Example 49 includes the switchable antenna port module for the repeater of any of Examples 43 to 48, further comprising: a controller configured to: switch a second-band signal input at the second-band amplification and filtering path port between the switchable common port and the switchable second band port; switch a third-band signal input at the third-band amplification and filtering path port between the switchable common port, the switchable second band port, and the switchable third band port; and enable a single port output configuration, a two-port output configuration, or a three-port output configuration for the signals input at the first-band amplification and filtering path port, the second-band amplification and filtering path port, and third-band amplification and filtering path port.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A bi-directional repeater having a switchable antenna port, comprising:
    a switchable common port;
    a switchable second-band port;
    a switchable third-band port;
    a first-band amplification and filtering path coupled to the switchable common port via a first path of a first multiplexer;
    a second-band amplification and filtering path coupled to one of:
        the switchable common port via a second path of the first multiplexer, a first path of a first radio frequency (RF) switch, and a first path of a second multiplexer; or
        the switchable second-band port via a second path of the second multiplexer, and a second path of the first RF switch;
    a third band amplification and filtering path coupled to:
        the switchable common port via a first path of a second RF switch, the second path of the second multiplexer, the first path of the first RF switch, and the second path of the first diplexer; or
        the switchable second-band port via the first path of the second RF switch, the second path of the second multiplexer, and the second path of the first RF switch; or
        the switchable third-band port via the second path of the second RF switch, to enable the bi-directional repeater to operate with a switchable: single port output configuration, a two-port output configuration, or a three-port output configuration for the signals carried by the first-band amplification and filtering path, the second-band amplification and filtering path, and third-band amplification and filtering path.

2. The bi-directional repeater of claim 1, wherein the first-band amplification and filtering path is further coupled to:
    a repeater port;
    a gain block;
    a first-band pass filter (BPF);

a low noise amplifier (LNA);
a variable gain power amplifier;
a fixed gain power amplifier; or
a variable attenuator.

3. The bi-directional repeater of claim 1, wherein the second-band amplification and filtering path is further coupled to:
a repeater port;
a gain block;
a second-band pass filter (BPF);
a low noise amplifier (LNA);
a variable gain power amplifier;
a fixed gain power amplifier; or
a variable attenuator.

4. The bi-directional repeater of claim 1, wherein the third-band amplification and filtering path is further coupled to:
a repeater port;
a gain block;
a third-band pass filter (BPF);
a low noise amplifier (LNA);
a variable gain power amplifier;
a fixed gain power amplifier; or
a variable attenuator.

5. The bi-directional repeater of claim 1, further comprising:
a third RF switch; and
a fourth RF switch;
wherein the third RF switch is coupled to the switchable second band port and further comprises:
a first path coupled to a second path of the first RF switch; or
a second path coupled to a second path of the fourth RF switch;
wherein the fourth RF switch is coupled to the second-band amplification and filtering path and further comprises:
a first path coupled to the first path of the second multiplexer.

6. The bi-directional repeater of claim 1, further comprising:
a third RF switch; and
a switchable fourth-band port;
wherein the third RF switch is coupled to the switchable second band port and further comprises:
a first path coupled to the first path of the second multiplexer; or
a second path coupled to the switchable fourth-band port.

7. The bi-directional repeater of claim 1, further comprising:
a controller configured to:
switch the second-band amplification and filtering path between the switchable common port and the switchable second band port; and
switch the third-band amplification and filtering path between the switchable common port, the switchable second band port, and the switchable third band port;
enable a single port output configuration, a two-port output configuration, or a three-port output configuration for the signals carried by the first-band amplification and filtering path, the second-band amplification and filtering path, and third-band amplification and filtering path.

8. The bi-directional repeater of claim 1, wherein the controller is further configured to:

adjust a signal output power level or a signal gain at the switchable common port, the switchable second-band port, or the switchable third-band port based on a switch position of one or more of the first RF switch and the second RF switch to provide a predetermined power level at each port based on known losses of passive components in the first-band amplification and filtering path, the second-band amplification and filtering path, and third-band amplification and filtering path.

9. The bi-directional repeater of claim 1, wherein each of the first-band amplification and filtering path, the second-band amplification and filtering path, and third-band amplification and filtering path are operable to carry one or more RF bands.

10. The bi-directional repeater of claim 1, wherein the RF switch is one or more of a RF switch, a solid-state (SS) RF switch, a micro electromechanical system (MEMS) RF switch, or a electromechanical RF switch.

11. The bi-directional repeater of claim 1, wherein the multiplexer is one or more of a diplexer, a triplexer, a quadplexer, a quintplexer, or a hexplexer.

12. A switchable antenna port hardware module for a repeater, comprising:
a switchable common port;
a switchable second-band port;
a switchable third-band port;
a first-band amplification and filtering path port coupled to the switchable common port via a first path of a first multiplexer;
a second-band amplification and filtering path port coupled to one of:
the switchable common port via a second path of the first multiplexer, a first path of a first radio frequency (RF) switch, and a first path of a second multiplexer; or
the switchable second-band port via a second path of the second multiplexer, and a second path of the first RF switch;
a third band amplification and filtering path port coupled to:
the switchable common port via a first path of a second RF switch, a second path of the second multiplexer, a first path of the first RF switch, and a second path of the first multiplexer; or
the switchable second-band port via the first path of the second RF switch, the second path of the second multiplexer, and the second path of the first RF switch; or
the switchable third-band port via the second path of the second RF switch.

13. The switchable antenna port hardware module for the repeater of claim 12, wherein:
the switchable common port is configured to be coupled to a first antenna;
the switchable second-band port is configured to be coupled to a second antenna; and
the switchable third-band port is configured to be coupled to a third antenna.

14. The switchable antenna port hardware module for the repeater of claim 12, wherein:
the first-band amplification and filtering path port is configured to be coupled to a first-band amplification and filtering path of the repeater;
the second-band amplification and filtering path port is configured to be coupled to a second-band amplification and filtering path of the repeater; and the third-band amplification and filtering path port is configured to be coupled to a third-band amplification and filtering path of the repeater.

15. The switchable antenna port hardware module for the repeater of claim 12, further comprising:
a third RF switch; and
a fourth RF switch;
wherein the third RF switch is coupled to the switchable second band port and further comprises:
a first path coupled to a second path of the first RF switch; or
a second path coupled to a second path of the fourth RF switch;
wherein the fourth RF switch is coupled to the second-band amplification and filtering path port and further comprises:
a first path coupled to the first path of the second multiplexer.

16. The switchable antenna port hardware module for the repeater of claim 12, further comprising:
a third RF switch; and
a switchable fourth-band port;
wherein the third RF switch is coupled to the switchable second band port and further comprises:
a first path coupled to the first path of the second multiplexer; or
a second path coupled to the switchable fourth-band port.

17. The switchable antenna port hardware module for the repeater of claim 12, further comprising:
a controller configured to:
switch the second-band amplification and filtering path port between the switchable common port and the switchable second band port; and
switch the third-band amplification and filtering path port between the switchable common port, the switchable second band port, and the switchable third band port.

18. The switchable antenna port hardware module for the repeater of claim 12, further comprising:
a controller configured to:
switch a second-band signal input at the second-band amplification and filtering path port between the switchable common port and the switchable second band port; and
switch a third-band signal input at the third-band amplification and filtering path port between the switchable common port, the switchable second band port, and the switchable third band port;
enable a single port output configuration, a two-port output configuration, or a three-port output configuration for the signals input at the first-band amplification and filtering path port, the second-band amplification and filtering path port, and third-band amplification and filtering path port.

19. The switchable antenna port hardware module for the repeater of claim 12, further comprising:
a module identification to enable the repeater to adjust a gain level to provide a signal with a predetermined power level at one of the switchable common port, the switchable second-band port, or the switchable third-band port, to compensate for signal loss in the switchable antenna port hardware module based on a configuration of the switchable antenna port hardware module and a switch position of one or more of the first RF switch and the second RF switch to provide a predetermined power level at each port based on known losses of passive components in the first-band amplification and filtering path, the second-band amplification and filtering path, and third-band amplification and filtering path.

20. The switchable antenna port hardware module for the repeater of claim 12, wherein the first RF switch and the second RF switch is one or more of a RF switch, a solid-state (SS) RF switch, a micro electromechanical system (MEMS) RF switch, or a electromechanical RF switch.

21. A bi-directional repeater having a switchable antenna port, comprising:
a switchable common port;
a switchable second-band port;
a first-band amplification and filtering path coupled to the switchable common port via a first path of a first multiplexer;
a second-band amplification and filtering path coupled to one of:
the switchable common port via a second path of the first multiplexer, a first path of a first radio frequency (RF) switch, and a first path of a second multiplexer; or
the switchable second-band port via a second path of the second multiplexer, and a second path of the first RF switch; and
a third band amplification and filtering path coupled to:
the switchable common port, via a second path of the second multiplexer, a first path of the first RF switch, and a second path of the first multiplexer; or
the switchable second-band port via the second path of the second multiplexer, and the second path of the first RF switch.

22. The bi-directional repeater of claim 21, further comprising:
a switchable third-band port;
the third band amplification and filtering path coupled to:
the switchable common port via a first path of a second RF switch, the second path of the second multiplexer, the first path of the first RF switch, and the second path of the first multiplexer; or
the switchable second-band port via the first path of the second RF switch, the second path of the second multiplexer, and the second path of the first RF switch; or
the switchable third-band port via a second path of the second RF switch.

23. The bi-directional repeater of claim 21, wherein the RF switch is one or more of a RF switch, a solid-state (SS) RF switch, a micro electromechanical system (MEMS) RF switch, or a electromechanical RF switch.

24. The bi-directional repeater of claim 21, wherein the first-band amplification and filtering path is further coupled to:
a repeater port;
a gain block;
a first-band pass filter (BPF);
a low noise amplifier (LNA);
a variable gain power amplifier;
a fixed gain power amplifier; or
a variable attenuator.

25. The bi-directional repeater of claim 21, wherein the second-band amplification and filtering path is further coupled to:
a repeater port;
a gain block;
a second-band pass filter (BPF);
a low noise amplifier (LNA);

a variable gain power amplifier;
a fixed gain power amplifier; or
a variable attenuator.

26. The bi-directional repeater of claim 21, wherein each of the first-band amplification and filtering path, the second-band amplification and filtering path, and the third-band amplification and filtering path are operable to carry one or more RF bands.

27. A bi-directional repeater having a switchable antenna port, comprising:
   a switchable common port;
   a switchable second-band port;
   a first-band amplification and filtering path coupled to the switchable common port via a first path of a first multiplexer;
   a second-band amplification and filtering path coupled to one of:
      the switchable common port via a second path of the first multiplexer, a first path of a first radio frequency (RF) switch, and a first path of a second multiplexer; or
      the switchable second-band port via a second path of the second multiplexer, and a second path of the first RF switch.

28. The bi-directional repeater of claim 27, further comprising:
   a third band amplification and filtering path coupled to:
      the switchable common port, via a second path of the second multiplexer, a first path of the first RF switch, and a second path of the first multiplexer; or
      the switchable second-band port via the second path of the second multiplexer, and the second path of the first RF switch; and
   a controller configured to adjust a signal output power level or a signal gain at the switchable common port, or the switchable second-band port, based on a switch position of the first RF switch to provide a predetermined power level at each port based on known losses of passive components in the first-band amplification and filtering path, and the second-band amplification and filtering path.

29. The bi-directional repeater of claim 27, wherein the controller is configured to adjust the signal output power level or the signal gain at the switchable common port or the switchable second-band port based on one or more of:
   measured losses in passive components of the first-band amplification and filtering path, and the second-band amplification and filtering path; or
   predetermined losses in the passive components of the first-band amplification and filtering path, and the second-band amplification and filtering path.

30. The bi-directional repeater of claim 27, wherein the first-band amplification and filtering path is further coupled to:
   a repeater port;
   a gain block;
   a first-band pass filter (BPF);
   a low noise amplifier (LNA);
   a variable gain power amplifier;
   a fixed gain power amplifier; or
   a variable attenuator.

31. The bi-directional repeater of claim 27, wherein the second-band amplification and filtering path is further coupled to:
   a repeater port;
   a gain block;
   a second-band pass filter (BPF);
   a low noise amplifier (LNA);
   a variable gain power amplifier;
   a fixed gain power amplifier; or
   a variable attenuator.

32. The bi-directional repeater of claim 27, further comprising:
   a splitter accessory having a first port operable to be connected to a server port of the bi-directional repeater, the splitter accessory having a second port, a third port, and an nth port configured to carry n split signals from the server port or to combine n signals to the server port;
   a controller configured to adjust a signal output power level or a signal gain at one or more of the n ports to provide a predetermined power level at one or more of the n ports based on known losses of passive components in the splitter accessory.

33. The bi-directional repeater of claim 32, wherein the controller is configured to adjust the signal output power level or the signal gain at one or more of the n ports or the splitter accessory based on one or more of:
   measured losses in passive components of the splitter accessory; or
   predetermined losses in the passive components of the splitter accessory.

* * * * *